United States Patent [19]

Glennon et al.

[11] Patent Number: 4,641,080

[45] Date of Patent: Feb. 3, 1987

[54] PERMANENT MAGNET GENERATOR WITH FAULT DETECTION

[75] Inventors: Timothy F. Glennon; Raymond N. Olson; Donald A. Straznickas, all of Rockford, Ill.

[73] Assignee: Sundstrand Corporation, Rockford, Ill.

[21] Appl. No.: 663,083

[22] Filed: Oct. 18, 1984

[51] Int. Cl.[4] .............................................. H02P 9/40
[52] U.S. Cl. ................................. 322/49; 310/152; 310/191; 322/52; 361/20
[58] Field of Search .................................. 322/49–52, 322/99, 100, 10, 44; 310/68 C, 152, 190, 191; 361/20, 21, 31, 32, 23, 24; 318/538–540

[56] References Cited

U.S. PATENT DOCUMENTS

| | | | |
|---|---|---|---|
| 441,794 | 12/1890 | Freeman | 310/191 |
| 672,419 | 4/1901 | Johnson | 310/191 |
| 731,836 | 6/1903 | Ash | 310/191 |
| 981,881 | 1/1911 | Rhodes | 310/209 |
| 1,072,647 | 9/1913 | Pifer | 310/191 |
| 1,104,793 | 7/1914 | Grillet et al. | 322/51 X |
| 1,559,920 | 11/1925 | Stewart | 318/830 |
| 1,855,617 | 4/1932 | Stewart | 310/254 X |
| 2,113,102 | 4/1938 | Whittle | 310/191 X |
| 2,784,332 | 3/1957 | Kober | 322/52 X |
| 2,807,772 | 9/1957 | Melentine | 322/50 |
| 2,812,458 | 11/1957 | Mennesson | 310/153 |
| 2,824,275 | 2/1958 | Kober | 322/27 |
| 3,014,143 | 12/1961 | Tardel | 310/191 |
| 3,229,138 | 1/1966 | Kober | 310/268 |
| 3,265,949 | 8/1966 | Rouverol | 318/243 |
| 4,025,840 | 5/1977 | Brissey et al. | 322/52 |
| 4,048,527 | 9/1977 | Hallerback et al. | 310/43 |
| 4,338,536 | 7/1982 | Hallidy | 310/191 |

*Primary Examiner*—R. J. Hickey
*Attorney, Agent, or Firm*—Wood, Dalton, Phillips, Mason & Rowe

[57] ABSTRACT

A generating system including a permanent magnet generator having a stator, a rotor journalled for rotation in proximity to the stator and normally separated therefrom by a small air gap. Permanent magnets and windings are provided on the stator and the rotor respectively, or the reverse as desired and a detector is provided for sensing the development of an electrical fault in the winding and for moving the stator away from the rotor to increase the air gap thereby reducing the magneto motive force available to induce current in the winding to prevent burn out of the winding.

8 Claims, 4 Drawing Figures

PERMANENT MAGNET GENERATOR WITH FAULT DETECTION

FIELD OF THE INVENTION

This invention relates to generating systems including a permanent magnet generator. More particularly, it relates to a permanent magnet generator in a generating system and provided with fault detection.

BACKGROUND ART

Permanent magnet generators are utilized in a large variety of generating systems. A typical usage requires the presence of a permanent magnet generator for generating field current for a so-called exciter. The exciter in turn utilizes the magnetic field created by the field current from the permanent magnet generator to generate more electrical power than could be generated by the permanent magnet generator itself. Such electric power is frequently multiple phase alternating current and the same is then rectified and passed to the main field winding of a main generator which in turn provides electrical power for consumption by various electrical loads.

One typical use of such a generating system is an aircraft.

Of course, such generating systems must be extremely reliable and steps must be taken to prevent disasterous failures.

One difficulty that must be faced in generating systems is the possibility of overheating and resultant destruction due to the creation of a fault, typically a short, in the electric components of the system.

In the case of a system such as described above, faults coming into existence in the exciter or main generator are relatively easily dealt with once they are detected. In the case of the development of a fault in the main field winding, it is only necessary to interrupt the source of power thereto as by disconnecting the exciter therefrom or disabling the exciter. Similarly, in the case of the development of a fault in the exciter field winding or rotor winding, it is only necessary to disrupt the flow of current from the permanent magnet generator to the exciter field. Faults developing in the main generator rotor winding can likewise be dealt with by preventing the flow of power to the main field winding or by shedding the electrical load connected to the rotor winding.

However, the task is not so easy when a fault develops in the winding of a permanent magnet generator, particularly when employed as part of an aircraft generating system or other similar generating system where the generator cannot be mechanically decoupled from the prime mover and where the prime mover cannot be shut down.

In particular, an inherent characteristic of a permanent magnet generator is the presence of stored magnetic energy which cannot be shut off by external means. Thus, where the prime mover cannot be shut down, as in the case of an aircraft engine, when a fault begins to develop, the stored magnetic energy of the permanent magnet generator will continue to induce voltage in the permanent magnet generator winding. If such winding is in the process of developing a fault, as, for example, a short, this continued generation of electrical voltage will continue to aggrevate the developing fault until the same burns free due to current resulting from the induced voltage.

The consequences of such an occurrence are dependent upon the severity of the fault but in any event are to be avoided since, at the very least, the winding carrying part of the permanent magnet generator may be destroyed beyond the point where it may be reused or rebuilt.

The present invention is directed to overcoming one or more of the above problems.

SUMMARY OF THE INVENTION

It is the principal object of the invention to provide a generating system including a permanent magnet generator including means for disabling the permanent magnet generator in response to the detection of a fault within the system. More specifically, it is an object of the invention to provide a permanent magnet generator construction whereby current generation by the permanent magnet generator may be abruptly reduced or halted altogether in response to the detection of a fault without mechanically decoupling the generator from a prime mover or terminating operating of the prime mover.

An exemplary embodiment of the invention achieves the foregoing objects in a generating system including a permanent magnet generator having a stator, a rotor journalled for rotation in proximity to the stator and normally separated therefrom by a small air gap, and at least one permanent magnet carried by one of the rotor and the stator. At least one winding is carried by the other of the rotor of the stator and means are provided for detecting the development of an electrical fault in the system and in response thereto moving the stator away from the rotor to increase the air gap to thereby reduce the magneto motive force available to induce current in the winding.

Where the generating system may include the other components of a typical brushless generator used, for example, in aircraft, the rotor carries the permanent magnet or magnets and the winding or windings are carried by the stator.

The invention contemplates the provision of means mounting the stator and the winding for movement toward and away from the rotor, a means for moving the stator and the winding away from the rotor, a means for detecting the development of a fault in the stator winding, and a means responsive to the detecting means for operating the moving means.

In a highly preferred embodiment of the invention, the stator is mechanically segmented into at least two relatively movable segments and the moving means is operable to move the segments away from each other and from the rotor.

According to one embodiment, the mounting means includes a hinge interconnecting the segments while the moving means comprises a motor acting upon the segments at a location spaced from the hinge.

According to another embodiment of the invention, the mounting means includes spaced screw shafts having sections of opposite pitch interconnecting the segments. The moving means comprises motor means for rotating the screw shafts.

In a highly preferred embodiment of the invention, the detecting means comprise differential current sensing means electrically associated with the winding.

Other objects and advantages will become apparent from the following specification taken in connection with the accompanying drawings.

DESCRIPTION OF THE PREFERRED EMBODIMENT

Figure 1:
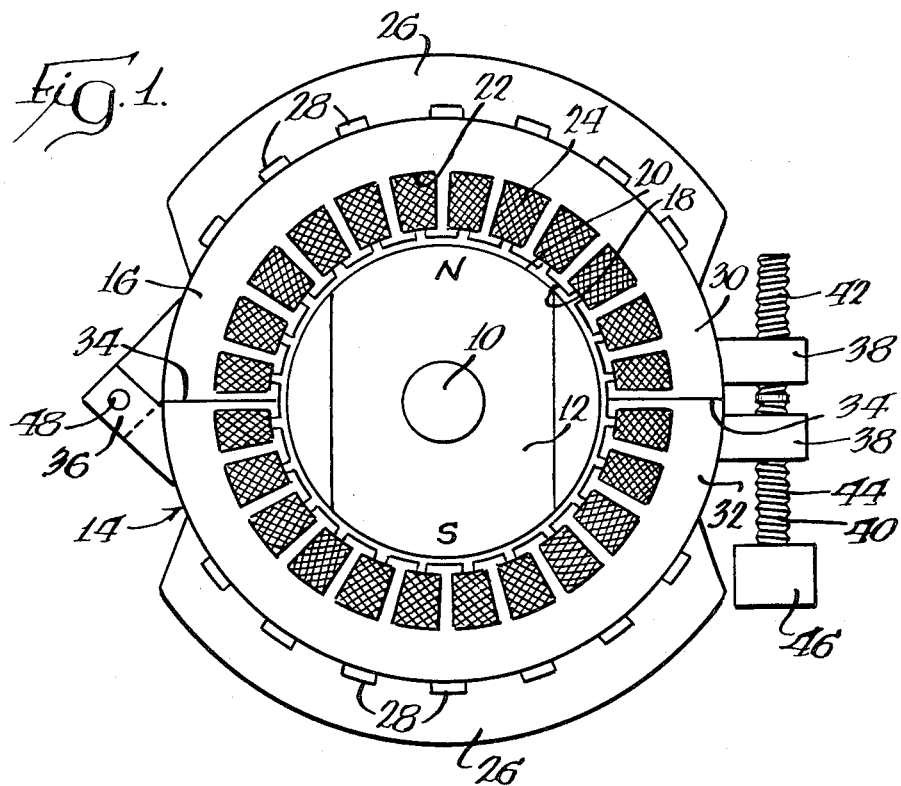
FIG. 1 is an end view of one embodiment of a permanent magnetic generator for use in a generating system according to the invention.

An exemplary embodiment of a permanent magnet generator made according to the invention is illustrated in FIG. 1 and is seen to include a suitably journalled rotor shaft 10 mounting at least one permanent magnet 12 for rotation therewith about the rotational axis of the shaft 10. Surrounding the rotor just thus defined is a stator, generally designated 14, formed of a plurality of laminations 16 each having a concave inner surface 18 spaced from the periphery of the rotor by a small amount which is, of course, a conventional air gap 20.

The stator laminations 16 include a series of slots 22 of conventional configuration which receive one or more electrical winding 24. As a consequence of this construction, it will be appreciated that rotation of the shaft 10 will cause rotation of the permanent magnet 12 which in turn will induce electrical current in the windings 24.

Manifold structures 26 having coolant passages 28 adjacent the stator laminations 16 may be provided to achieve so-called "back iron" cooling.

According to the invention, the stator laminations 16, and thus the stator 14, are formed of two or more segments 30 and 32. The ends of the segments are shown at 34 and are disposed on an extended radius of the shaft 10. In the embodiment illustrated in FIG. 1, the segments 30 and 32 are hinged together by means of a hinge 36. At a location remote from the hinge 36, each of the segments 30 and 32 is provided with an internally threaded lug 38. A screw shaft 40 is threaded through the lugs 38 and it will be seen that the screw shaft 40 has a first section 42 having one screw thread pitch and a second section 44 having the opposite screw thread pitch. The section 42 is threaded in the lug 38 associated with the segment 30 while the section 44 is threaded in lug 38 associated with the segment 32.

A motor 46 is connected to the screw shaft 40 for purposes of rotating the same. As can be appreciated, for one direction of rotation of the motor 46, the stator segment 30 and 32 will assume the position illustrated in FIG. 1 at a limit of travel of the two as they approach each other and the rotor. For the opposite direction of rotation of the motor 46, the stator segments 30 and 32 will be pivoted away from each other and from the rotor about the rotational axis 48 of the hinge 36. This will, in turn, considerably increase the width of the air gap 20 with the consequence that the magnetic flux provided by the magnet 12 to the winding 24 will be considerably reduced. Stated another way, the magneto motive force provided by the magnet 12 available to induce current in the windings 24 will be progressively reduced as the air gap is increased. As a consequence, the amount of current induced in the winding 24 will be drastically reduced.

As a result, if a fault is developing in the winding 24 and the motor 46 is energized to drive the stator segments 30 and 32 apart, the resulting considerable reduction in induced voltage and fault current within the winding 24 will result in a current level insufficient to burn through the fault. Thus, if the motor 46 is operated as soon as the initiation of development of a fault is indicated, the permanent magnet generator may be effectively shut down even though the shaft 10 may continue to rotate under the influence of a prime mover.

Figure 2:
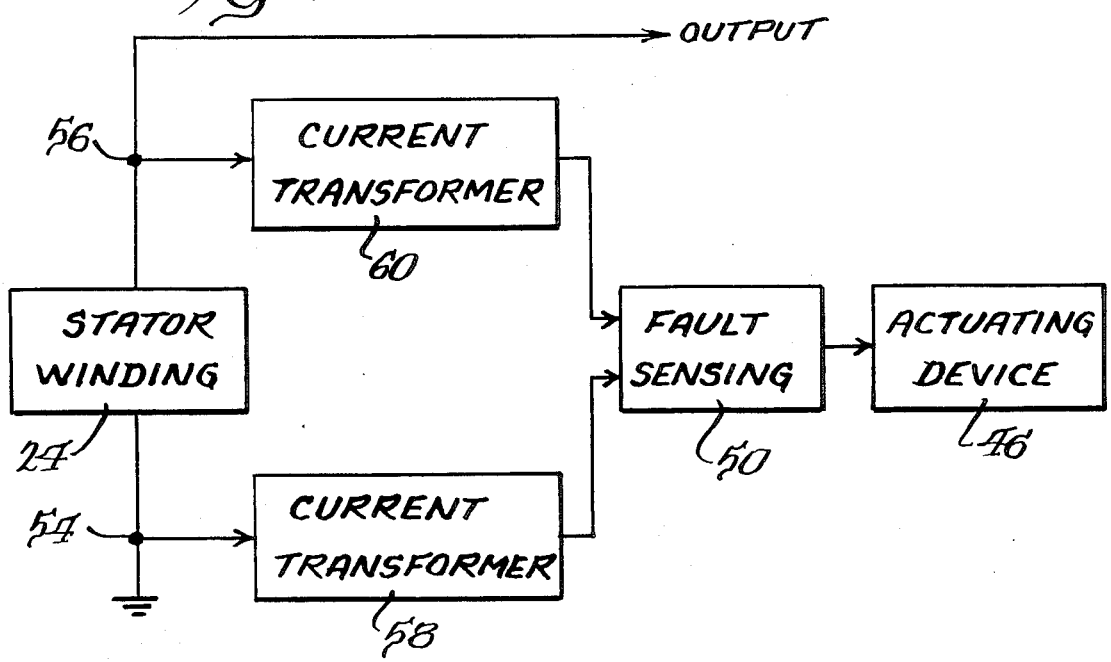
FIG. 2 is a block diagram illustrating a system for deactivating the permanent magnet generator.

FIG. 2 illustrates, in block form, a system for accomplishing the foregoing. The stator winding 24 provides an output to a fault sensing device 50 to be described hereinafter. When the development of a fault is initiated, a fault sensing device 50 provides a signal to an actuating device, i.e., the motor 46 to energize the same to drive the segments 30 and 32 apart. Power for the motor 46 may be taken from the stator winding, and provided with appropriate voltage regulation by any suitable means since fault detection will typically occur while the winding 24 is still providing current.

Figure 3:
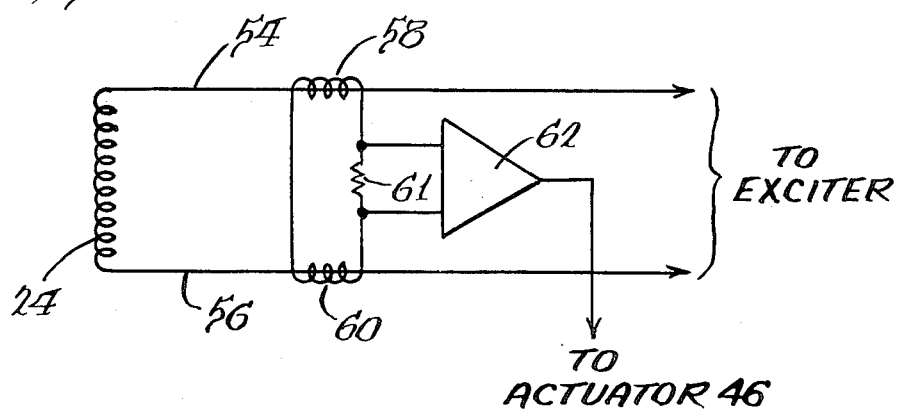
FIG. 3 is an electric schematic of a fault detecting circuit.

FIG. 3 illustrates a preferred form of fault sensing device. The stator winding is shown at 24 as having opposite terminals 54 and 56. One current transformer 58 is associated with the terminal 54 and another current transformer 60 is associated with the terminal 56. The two are connected across a burden resister 61 and then as illustrated to a comparator or the like 62. The output of the comparator 62 is utilized to actuate the motor 46.

When there is no fault present, it will be appreciated that the current at the terminals 54 and 56 will be identical, regardless of voltage, frequency or the like. Conversely, should a short begin to develop will be identical, regardless of voltage, frequency or the like. Conversely, should a short begin to develop within the winding 24, the current at one or the other of the terminals 54 and 56 will begin to drop below the current at the other. This difference in current is then provided to the comparator 62 which will then energize the motor 46 to drive the segments 30 and 32 away from each other and away from the rotor.

Where the permanent magnet generator has plural, electrically separated windings as for generating different phases, a detector as shown in FIG. 3 is associated with each phase.

It will also be appreciated that if desired, similar detectors can be associated with other windings in a generating system of the type described previously so that the motor 46 may be responsive to any fault developing in any winding of the system as well as faults developing in the permanent magnet winding.

It will also be appreciated that while in the embodiment illustrated, the permanent magnets 12 are part of the rotor and the winding 24 is carried by the stator, the reverse could be true. The embodiment illustrated is especially intended for use in a so-called brushless generator which thereby necessitates provision of the windings on the stator rather than on the rotor.

Figure 4:
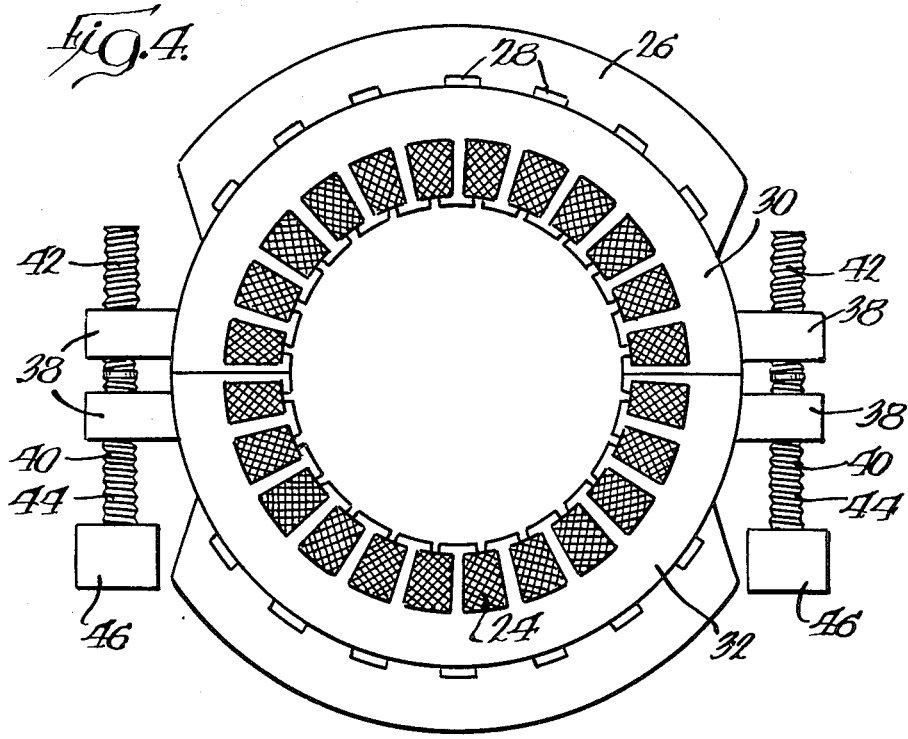
FIG. 4 is an end view similar to FIG. 1 but showing a modified embodiment of the permanent magnetic generator.

FIG. 4 illustrates an alternate embodiment of the invention and like components are given like reference numerals for simplicity. According to this embodiment, the hinge 36 is dispensed with an in its place, two additional ones of the lugs 38, one secured to the segment 30 and the other secured to the segment 32, are provided. An additional motor 46 and associated screw shaft 40 having oppositely pitched sections 42 and 44 are associated with such additional lugs and the additional motor 46 is energized in the same fashion as that illustrated in FIG. 1. As a consequence of this construction, rather than the segments 30 and 32 moving away from each other and from the rotor as by pivoting, the segments are moved away from each other linearly along a diameter of the assembly.

From the foregoing, it will be appreciated that a permanent magnet generator made according to the invention overcomes the difficulties heretofore encountered in attempting to disable permanent magnet generators when they or other system parts associated therewith develop faults without mechanically decoupling the same from the prime mover driving them or without shutting down the prime mover. The screw shafts 40 may be designed to provide any necessary degree of movement sufficient to widen the air gap to the point where induced current in the winding 24 is reduced to any desired safe level.

We claim:

1. In a generating system including a permanent magnet generator, the combination of:
   a rotor carrying at least one permanent magnet;
   a stator in proximity to said rotor and normally separated therefrom by a small air gap;
   at least one electrical winding magnetically associated with said stator and in which current may be induced by a magnetic field generated by said permanent magnet;
   means mounting said stator and said winding for movement toward and away from said rotor;
   means for moving said stator and said winding away from said rotor;
   means for detecting the development of a fault in said winding; and
   means responsive to said detecting means for operating said moving means;
   whereby upon detection of the development of a fault in said winding, said winding and said stator will be moved away from said rotor to reduce the magneto motive force available to induce current in said winding to thereby reduce the current induced in said winding to prevent destruction of said permanent magnet generator.

2. The generating system of claim 1 wherein said stator and said winding are mechanically segmented into at least two relatively movable segments; and said moving means is operable to move said segments away from each other and from said rotor.

3. The generating system of claim 2 wherein said mounting means includes a hinge interconnecting said segments and said moving means comprises a motor acting upon said segments at a location spaced from said hinge.

4. The generating system of claim 2 wherein said mounting means includes spaced screw shafts having sections of opposite pitch interconnecting said segments, and said moving means comprises motor means for rotating said screw shafts.

5. The generating system of claim 2 wherein said detecting means comprises differential current sensing means electrically associated with said winding.

6. In a generating system including a permanent magnet generator, the combination of:
   a rotor carrying at least one permanent magnet;
   a stator formed of a plurality of segments in proximity to said rotor and normally separated therefrom by a small air gap;
   at least one electrical winding mounted on said stator and in which current may be induced by a magnetic field generated by said permanent magnet;
   means mounting said stator segments for movement toward and away from said rotor;
   at least one motor for moving said stator segments away from said rotor;
   differential current sensing means for detecting differing current flow at electrically spaced points in said winding; and
   means responsive to said differential current sensing means for operating said motor;
   whereby upon detection of differing currents in said winding, said stator with the winding mounted thereon will be moved away from said rotor to reduce the magneto motive force available to induce current in said winding to thereby reduce the current induced in said winding.

7. The generating system of claim 6 wherein said winding is connected to an exciter adapted to energize the main field winding of a generator.

8. In a generating system including a permanent magnet generator, the combination of:
   a stator;
   a rotor journalled for rotation in proximity to said stator and normally separated therefrom by a small air gap;
   at least one permanent magnet carried by one of said rotor and said stator;
   at least one winding carried by the other of said rotor and said stator; and
   means for detecting the development of an electrical fault in said winding and in response thereto moving said stator away from said rotor to increase said air gap to reduce the magneto motive force available to induce current in said winding.

* * * * *